US006698987B1

United States Patent
Dicke

(10) Patent No.: US 6,698,987 B1
(45) Date of Patent: Mar. 2, 2004

(54) SELF-DRILLING AND THREAD-FORMING CONNECTING ELEMENT

(75) Inventor: Robert Dicke, Ennepetal (DE)

(73) Assignee: A-Z Ausrustung und Zubehor GmbH & Co. KG, Hattingen (DE)

( * ) Notice: Subject to any disclaimer, the term of this patent is extended or adjusted under 35 U.S.C. 154(b) by 0 days.

(21) Appl. No.: 09/980,919

(22) PCT Filed: Mar. 15, 2000

(86) PCT No.: PCT/EP00/02269

§ 371 (c)(1),
(2), (4) Date: May 10, 2002

(87) PCT Pub. No.: WO00/61958

PCT Pub. Date: Oct. 19, 2000

(30) Foreign Application Priority Data

Apr. 8, 1999 (DE) ..................................... 299 06 274 U

(51) Int. Cl.$^7$ .............................................. F16B 25/10
(52) U.S. Cl. .............................. 411/387.6; 411/387.4; 411/399
(58) Field of Search .......................... 411/387.1, 387.2, 411/387.3, 387.4, 387.5, 387.6, 387.7, 387.8, 399

(56) References Cited

U.S. PATENT DOCUMENTS

| 3,710,676 A | * | 1/1973 | Ringland | ................. 411/387.7 |
| 4,016,795 A | * | 4/1977 | Gill | ......................... 411/387.8 |
| 4,064,784 A | * | 12/1977 | Adler | ....................... 411/387.8 |
| 4,708,557 A | * | 11/1987 | Hashimoto | ............... 411/387.8 |
| 4,836,730 A | * | 6/1989 | Jesson et al. | ............ 411/387.6 |
| 5,487,633 A | * | 1/1996 | Roberts | ................... 411/387.3 |
| 6,164,887 A | * | 12/2000 | Palm | ....................... 411/387.7 |

* cited by examiner

*Primary Examiner*—Neill Wilson
(74) *Attorney, Agent, or Firm*—Brinks Hofer Gilson & Lione

(57) ABSTRACT

The present invention relates to a self-drilling and thread-forming connecting element, in particular a screw. The screw comprises a threaded shank including a cylindrical core and a thread formed as a protuberance on the core. The screw also includes an end drilling tip for drilling a core hole for the thread.

17 Claims, 3 Drawing Sheets

SELF-DRILLING AND THREAD-FORMING CONNECTING ELEMENT

BACKGROUND OF THE INVENTION

1. Field of the Invention

The present invention relates to a self-drilling and thread-forming connecting element, in particular a screw, comprising a threaded shank which consists of a cylindrical core and of a thread formed as a protuberance on the core, and comprising an end drilling tip for drilling a core hole for the thread.

2. Description of Related Art

Connecting elements which can be screwed into relatively hard materials, such as, for example, hard fiber materials, but also metals (sheets), while automatically forming a thread are known. Sheet-metal screws, for example, may be mentioned here. For this purpose, however, before the screw is screwed in, a core hole must be pre-drilled in a separate operation, the diameter of the core hole being dimensioned to be appropriately smaller in adaptation to the design of the thread on the threaded shank, so that a thread can be formed automatically in the core hole.

German Utility Model 297 11 128 discloses a connecting element of the generic type. In order to avoid the awkward and time-consuming pre-drilling of a core hole, the connecting element of the generic type has an end drilling tip, so that, directly during the screw-in operation, in the end region of the drilling tip, a core hole having a diameter corresponding to the core of the threaded shank is drilled in the respective material by chip removal. The threaded shank adjoining the drilling tip is subsequently screwed into this core hole like a sheet-metal screw. In the process, the corresponding internal thread is formed automatically. The known connecting element has already proved to be very successful in practical use. It is conceived in particular for hard fiber materials. In this case, however, a problem has been found in practice, to be precise specifically with "MDF boards" (MDF=medium density fiber board), to be precise if the screw is to be screwed into the board at the end face, that is from the cut edge. This is the case, for example, for the fastening of fittings, corner screwed connections, etc. In this application, when the respective screw is being screwed in, splintering or bursting of the fiber board often occurs, which then jeopardizes the fastening function.

SUMMARY OF THE INVENTION

The object of the present invention is therefore to provide a connecting element of the generic type which is also suitable for this special application without any problems, that is to say also for screwed connections at the end face in MDF boards.

According to the invention, this is achieved in that the drilling tip defines a core-hole drilling diameter which is larger than the diameter of the cylindrical core of the threaded shank and smaller than a thread diameter defined by an outer thread edge of the threaded shank.

By this measure according to the invention, when the screw is drilling in and being screwed in, a clearance space of annular cross section is formed inside the material directly behind the drilling tip, and this clearance space serves to receive the cuttings produced during the drilling operation. The invention is thus based on the knowledge that, when the known connecting elements are being used, the cuttings produced accumulate very quickly and produce an increase in pressure, which then causes the splintering of the material. By means of the invention, the cuttings produced can be distributed in the clearance space behind the drilling tip in such a way that they remain there, essentially free of pressure, between the thread turns when the screw is screwed in further. By the drilling diameter being smaller than the outer thread diameter, reliable retention of the connecting element in the respective material is ensured. For this purpose, it is especially expedient if the drilling diameter is about 20 to 30% larger than the core diameter and about 20 to 25% smaller than the thread diameter.

The connecting element according to the invention may preferably have two alternative embodiments. In the first embodiment, the drilling tip has a relatively short length which is at most approximately equal to the core diameter. The cuttings can pass across this short path very quickly and virtually without hindrance into the clearance space in the region of the threaded shank between the thread turns and the core hole. In this case, the drilling tip preferably has two diametrically opposite cutting edges starting from a spot-drilling point and defining a cutting angle, a flute extending approximately axially in the direction of the threaded shank being arranged upstream of each cutting edge as viewed in the screw-in direction. These flutes form passages via which the cuttings can pass to the rear from the drilling region into the clearance space.

The second advantageous embodiment has a relatively long drilling tip, the cutting angle of which is preferably less than 90°, in particular 40° to 60°. In contrast to the first embodiment, a thread-free section preferably adjoins the drilling tip. This embodiment according to the invention ensures that, in particular in thin boards of about 12–15 mm, in the case of a screwed connection at the end face and an edge screwed connection, the wall of the drill hole cannot break away or become warped, since the cuttings which occur are effectively discharged.

Further advantageous design features of the invention are contained in the subclaims and the following description.

BRIEF DESCRIPTION OF THE DRAWINGS

The invention is to be explained in more detail below with reference to a preferred exemplary embodiment illustrated in the drawing, in which.

The same parts are always provided with the same reference numerals in the various figures of the drawing.

DETAILED DESCRIPTION OF THE INVENTION

Figure 1:
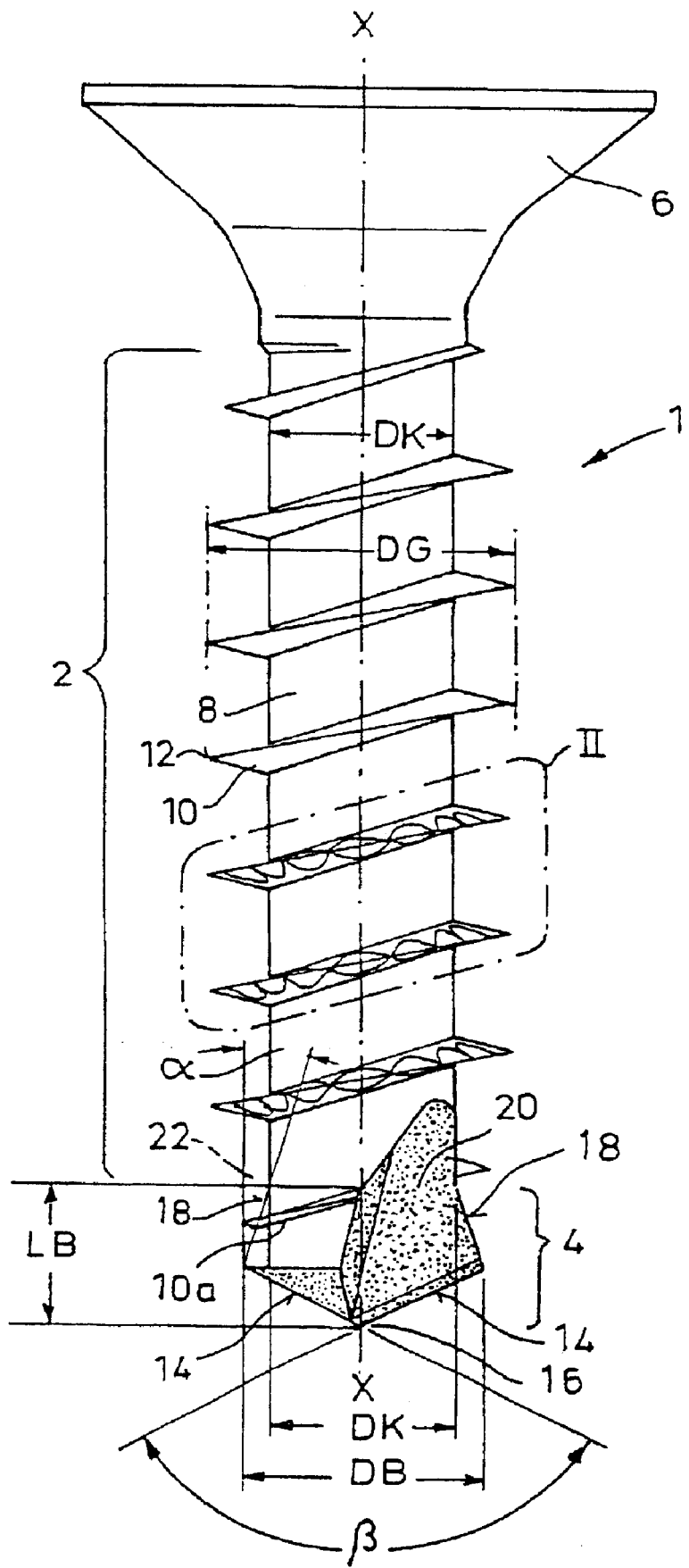
FIG. 1 shows a greatly enlarged side view of a connecting element according to the invention, here designed, by way of example, as a countersunk head screw.

A screw 1 is illustrated by way of example in FIG. 1 as a connecting element according to the invention, this screw 1 having a threaded shank 2 and an end drilling tip 4. In addition, at the other end, the screw 1 has a screw head 6, which in the example shown is designed as a countersunk head and is provided with internal force engagement (not shown in the drawing) for a screwdriver (slot, cross recess, hexagon socket or the like). However, the connecting element may in principle also be designed without a head as a stud bolt or the like.

The threaded shank 2 consists of an essentially cylindrical core 8, i.e. circular in cross section, and of a thread 10 running helically as a protuberance over the core 8. In the example shown, the thread is a single-start thread 10 having a roughly V-shaped cross section and an outer, relatively sharp thread edge 12.

According to the invention, the drilling tip 4 defines a core-hole drilling diameter DB which is larger than the diameter DK of the cylindrical core 8 of the threaded shank 2. Furthermore, the drilling diameter DB is also smaller than a thread diameter DG defined by the outer thread edge 12. The drilling diameter DB is expediently about 20 to 30% larger than the core diameter DK and about 20 to 25% smaller than the thread diameter DG. In a realized embodiment, this leads, for example, to the following actual dimensions: at a thread diameter DG of 4 mm, the core diameter DK is normally about 2.4 to 2.5 mm. In this case, the drilling diameter DB should preferably be about 3.1 mm.

The drilling tip 4 has at least one cutting edge 14 defining the drilling diameter DB. In the example shown, however, the drilling tip 4, like a twist drill, has two diametrically opposite cutting edges 14 starting from a spot-drilling point 16 and defining a cutting angle $\beta$. The cutting edges 14, starting from the spot-drilling point 16, run in the longitudinal direction of the screw 1 on generating lines of the drilling tip 4, so that the projections of the cutting edges 14 fall onto a longitudinal axis X—X of the screw 1. Those ends of the cutting edges 14 which are opposite the spot-drilling point 16 define the drilling diameter DB. Starting ends of the cutting edges 14, the drilling tip 4 has a roughly conically tapering inclined surface 18 merging into the core 8 of the threaded shank 2. The drilling tip 4 therefore begins at the transition point between the cylindrical core 8 and the conical inclined surface 18 and ends at the spot-drilling point 16. The length LB of the drilling tip 4 is accordingly depicted in FIG. 1. According to the invention, this length LB of the drilling tip 4 is kept relatively short; it corresponds at most to approximately the core diameter DK, i.e. LB$\leq$DK. In this case, the thread 10 also advantageously runs over the region of the conical inclined surface 18 of the drilling tip 4, to be precise especially with such a decreasing thread diameter and preferably also with a decreasing thread cross section that the thread 10 already runs out toward the free end of the drilling tip 4 on the conical inclined surface 18 just before the cutting edges 14. This can easily be seen in FIG. 1, for the thread turn 10$a$ is markedly smaller than the rest of the thread 10 in the region of the screw shank 2. Furthermore, provision is made for a flute 20 extending approximately axially in the direction of the threaded shank 2 to be arranged upstream of each cutting edge 14 as viewed in the screw-in direction. Each flute 20 interrupts the run of the thread 10 or 10$a$ and preferably runs out in the starting region of the core 8.

This preferred design described, i.e. the length LB or rather the "shortness" of the drilling tip 4, in combination with the conical inclined surface 18, the flutes 20 and the thread 10 or 10$a$ running across this region with decreasing diameter and preferably also with decreasing cross section, advantageously achieves the effect that the cuttings produced during the drilling operation or the resulting material particles, possibly also small chips, can easily pass to the rear from the drilling region, so that accumulation and resulting, pressure-related bursting of the material is avoided. The cuttings pass via the flutes 20 virtually without hindrance into a clearance space 22 which is formed according to the invention behind the drilling tip 4 and is annular in cross section, the transport of these cuttings also being assisted by a type of "spindle function" of the thread turn 10$a$ decreasing in cross section.

In the exemplary embodiment shown, the length LB of the drilling tip 4 corresponds at most to approximately a complete thread turn, i.e. the thread pitch. The conical inclined surface 18 encloses with the longitudinal axis X—X of the connecting element an angle $\alpha$ which should lie approximately within a range of 50 to 200. The cutting angle $\beta$ is about 90° to 130°.

Figure 2:
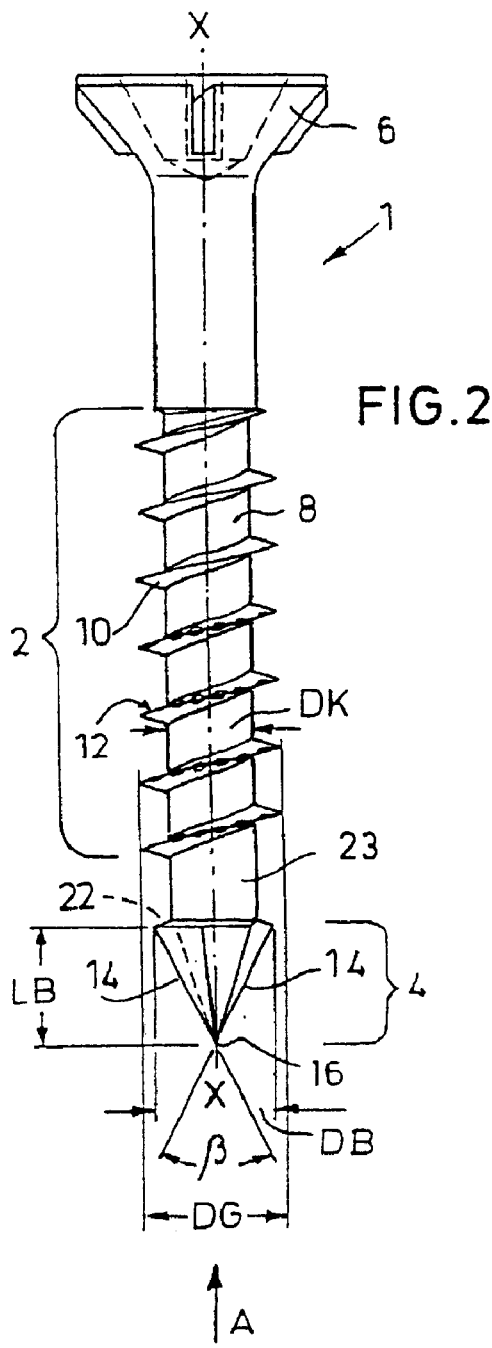
FIG. 2 shows a greatly enlarged side view of a second connecting element according to the invention, here designed, by way of example, as a countersunk head screw.

FIG. 2 shows a second screw 1 according to the invention, in particular a countersunk head screw, but having a drilling tip 4 of a design which is different from the screw 1 shown in FIG. 1 and having an adjoining thread-free section 23 of the cylindrical core 8. The thread-free section 23 has a length which is about 80 to 150%, preferably 100%, of the diameter DK of the cylindrical core 8. The cutting angle $\beta$ is less than 90°, in particular 40° to 60°. This small cutting angle $\beta$ is advantageous for an axial discharge of the cuttings produced. The thread-free section 23 achieves the effect that the edge of the drill hole does not break away when the screw 1 is being screwed in, since the thread 10 producing the feed does not engage until the drilling tip 4 has already penetrated deeper into the drill hole, so that no adverse forced feed of the screw is effected by the thread pitch at the start of the screw-in operation. In addition, the small cutting angle $\beta$ brings about a more favorable force distribution during the screwing-in, so that the forces of the screw 1 according to the invention which act on the edge of the drill hole are less than in the case of large cutting angles $\beta$.

Figure 3:
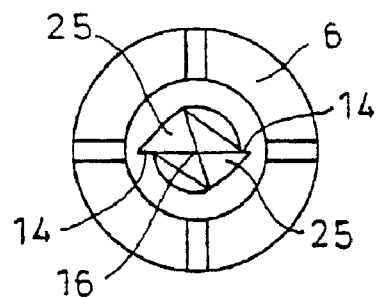
FIG. 3 shows a plan view of a prismatic drilling tip in the direction A depicted in FIG. 2, this drilling tip being formed from two rotationally symmetrical oblique pyramids with a triangular base area.

FIG. 3 shows an advantageous prismatic design of the drilling tip 4. The drilling tip 4 is formed by two oblique pyramids 25 with a triangular base area, the pyramid apexes of which together form the spot-drilling point 16. The two pyramids 25 are connected to one another via their side faces and are preferably arranged in a rotationally symmetrical manner about the longitudinal axis X—X, running through the common spot-drilling point 16, of the screw 1. The two pyramids 25 are arranged offset from one another perpendicularly to the longitudinal axis X—X of the screw 1 in such a way that a projecting region of the pyramids 25, this region being formed opposite the respective other pyramid 25, forms a cutting edge 14. Starting from the spot-drilling point 16, the cutting edges 14 run in the longitudinal direction of the screw 1 on generating lines of the drilling tip 4, so that the projections of the cutting edges 14 fall onto the longitudinal axis X—X of the screw 1. Those ends of the cutting edges 14 which are opposite the spot-drilling point 16 define the drilling diameter DB.

Figure 4:
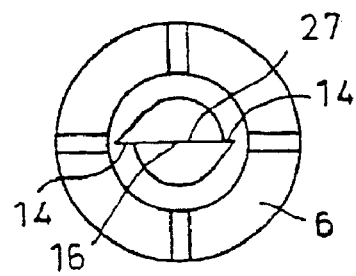
FIG. 4 shows a plan view of a drilling tip in the direction A depicted in FIG. 2, this drilling tip being shaped conically and having two cutting edges.

FIG. 4 shows a further advantageous drilling tip 4 which is formed from a conical body 27 having a circular base area. From the conical body 27, two diametrically opposite regions, in cross section, are led tangentially out of the lateral surface 27 of the cone, which results in projecting regions which again form the cutting edges 14. The cutting edges 14 likewise run on generating lines of the drilling tip 4, their projection falling onto the longitudinal axis X—X of the screw 1 and their ends opposite the spot-drilling point 16 defining the drilling diameter DB.

Figure 5:
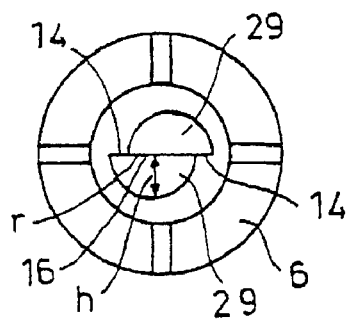
FIG. 5 shows a plan view of a drilling tip in the direction A depicted in FIG. 2, this drilling tip being formed from two narrowing circle segments offset radially from one another.

FIG. 5 shows a drilling tip 4 whose base area is formed from two circle segments 29, the arc height h of which is less than their circle radius r. This drilling tip 4 according to the invention also has two diametrically opposite cutting edges 14, which are obtained as a result of the two circle segments 29 being radially offset from one another and the course of which corresponds to the course of the cutting edges 14 described with respect to FIG. 4. Those ends of the cutting edges 14 which are opposite the spot-drilling point 16 also define the drilling diameter DB in this embodiment according to the invention.

Figure 6:
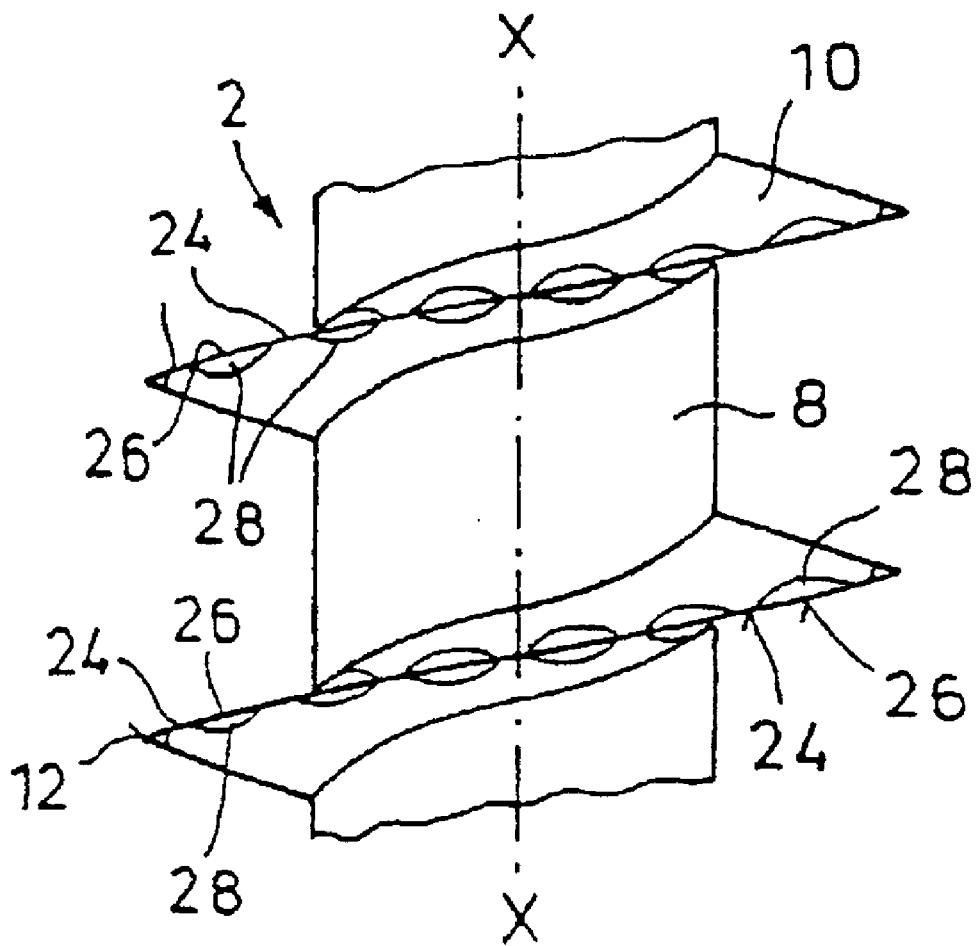
FIG. 6 shows an enlarged partial view of the region II in FIG. 1.

As can best be seen from the enlarged representation in FIG. 6, provision is made in both preferred embodiments for the thread 10, across a threaded region, adjoining the drilling tip 4 or the thread-free section, of one to five, in particular, as shown, about three or four, thread turns, to be of wavelike design in the region of its radially outer thread edge 12 in such a way that there is a sequence of wave crests 24 and wave troughs 26. In this case, concave recesses 28 are formed preferably in the region of the wave troughs 26 in the flank region of the thread 10. By this design (known per se), the forming of the thread is effectively improved even in relatively hard materials, and high retaining forces are achieved (low screw-in moment, high releasing moment).

On account of the design according to the invention and the preferred design features described, the screw 1 according to the invention is suitable in particular for use in relatively hard materials, such as, in particular, hard fiber materials. This may also include a mixture of concrete with fibers.

In order to achieve an adequate drilling effect even in the case of such relatively hard materials, the connecting element according to the invention, at least in the region of the drilling tip 4, but preferably also in the region of the threaded shank 2, consists of a hardened, highly carburized steel.

The invention is not restricted to the exemplary embodiments shown and described, but also includes all the embodiments having the same effect within the scope of the invention. Furthermore, the invention so far is also not yet restricted to the combination of features defined in claim 1, but may also be defined by any other desired combination of certain features of all the individual features disclosed in their entirety. This means that, in principle, virtually any individual feature of claim 1 may be omitted or be replaced by at least one feature disclosed elsewhere in the application. In this respect, claim 1 is to be understood merely as a first attempt at defining the invention.

What is claimed is:

1. Self-drilling and thread-forming connecting element, in particular a screw comprising a threaded shank having a cylindrical core and a thread formed as a protuberance on the core, and comprising an end drilling tip having linear cutting edges and intended for drilling a core hole for the thread, the drilling tip defining a core-hole drilling diameter which is larger than the diameter of the cylindrical core of the threaded shank and smaller than the thread diameter defined by an outer thread edge of the threaded shank, and a thread-free section of the cylindrical core adjoining the drilling tip, whereby a cutting angle ($\beta$) enclosed by the linear cutting edges of the drilling tip is less than 90°, in particular 40° to 60°.

2. The connecting element as claimed in claim 1, characterized in that the drilling diameter is about 20 to 30% larger than the core diameter and about 20 to 25% smaller than the thread diameter.

3. The connecting element as claimed in claim 1 wherein the drilling tip has two diametrically opposite cutting edges which start from a spot-drilling point, define a the cutting angle ($\beta$), run on generating lines of the drilling tip, and the projections of which fall onto a longitudinal axis of the screw.

4. The connecting element as claimed in claim 1 wherein the thread-free section has a length which is about 80 to 150%, preferably 100%, of the core diameter.

5. The connecting element as claimed in claim 1 wherein the drilling tip is a prismatic drilling tip having two oblique pyramids with a triangular base area and pyramid apexes of which together form a spot-drilling point, the two oblique pyramids being connecting to one another via one of their side faces.

6. The connecting element as claimed in claim 5, wherein the oblique pyramids are arranged in a rotationally symmetrical manner about the longitudinal axis, running through the spot-drilling point, of the screw.

7. The connecting element as claimed in claim 6, wherein the two oblique pyramids are arranged offset from one another perpendicularly to the longitudinal axis of the screw in such a way that a projecting region of the pyramids, this region being formed opposite the respective other oblique pyramid, forms the cutting edge.

8. The connecting element as claimed in claim 1 wherein the drilling tip is designed as a conical body having a circular base area, two diametrically opposite regions, in cross section, being led tangentially out of the lateral surface of the cone and forming the cutting edges.

9. The connecting element as claimed in claim 1 wherein the drilling tip includes a base area formed from two circle segments offset from one another perpendicularly to the longitudinal axis of the screw, in which case regions of the two circle segments which project in each case opposite the other circle segment form the cutting edges.

10. The connecting element as claimed in claim 9, wherein the circle segments have an arc height which is equal to or less than their radius.

11. The connecting element as claimed in claim 1 wherein the thread, across a threaded region, adjoining the drilling tip, of one to five thread turns, is of wavelike design in the region of its radially outer thread edge in such a way that there is a sequence of wave crests and wave troughs, recesses being formed preferably in the region of the way troughs in the flank region of the thread.

12. A self-drilling and thread-forming connecting element, in particular a screw, comprising a threaded shank, having a cylindrical core and a thread formed as a protuberance on the core, and having a drilling tip which has linear cutting edges and is intended for drilling a core hole for the thread, the drilling tip defining a core-hole drilling diameter which is greater than the diameter of the cylindrical core of the threaded shank, and the drilling tip having a roughly conically tapering inclined surface merging into the core of the threaded shank, the drilling tip has a relatively short length which is at most about equal to the core diameter, and the thread also runs over the region of the drilling tip, to be precise with such a decreasing thread diameter and with such a decreasing thread cross section that the thread runs out towards the free end of the drilling tip on the conical inclined surface before the cutting edges.

13. The connecting element as claimed in claim 12, characterized in that the drilling diameter is about 20 to 30% larger than the core diameter and about 20 to 25% smaller than the thread diameter.

14. The connecting element as claimed in claim 12, wherein the drilling tip has two diametrically opposite cutting edges which start from a spot-drilling point, define the cutting angle ($\beta$), run on generating lines of the drilling tip, and the projections of which fall onto a longitudinal axis of the screw.

15. The connecting element as claimed in claim 12 wherein flutes extend approximately axially in the direction of the threaded shank.

16. The connecting element as claimed in claim 12 wherein the thread, across a threaded region, adjoining the drilling tip, of one to five thread turns, is of wavelike design in the region of its radially outer thread edge in such a way that there is a sequence of wave crests and wave troughs, recesses being formed preferably in the region of the way troughs in the flank region of the thread.

17. Self-drilling and thread-forming connecting element, in particular a screw comprising a threaded shank which consists of a cylindrical core and of a thread formed as a protuberance on the core, and comprising an end drilling tip having cutting edges and intended for drilling a core hole for the thread, the drilling tip defining a core-hole drilling diameter which is larger than the diameter of the cylindrical core of the threaded shank, and a thread-free section of the cylindrical core adjoining the drilling tip, and flute being arranged upstream of the cutting edges as viewed in the screw-in direction, characterized in that the core-hole drilling diameter core is smaller than the thread diameter defined by an outer thread edge of the threaded shank, and the cutting angle ($\beta$) enclosed by the cutting edges of the drilling tip is less than 90°, in particular 40° to 60°; wherein the drilling diameter is about 20 to 30% larger than the core diameter and about 20 to 25% smaller than the thread diameter.

* * * * *

UNITED STATES PATENT AND TRADEMARK OFFICE
CERTIFICATE OF CORRECTION

PATENT NO. : 6,698,987 B1
DATED : March 2, 2004
INVENTOR(S) : Robert Dicke

It is certified that error appears in the above-identified patent and that said Letters Patent is hereby corrected as shown below:

Column 5,
Line 64, after "define" and before "the cutting" delete "a".

Column 8,
Line 5, after "diameter" and before "is smaller" delete "core".

Signed and Sealed this

Eighth Day of June, 2004

JON W. DUDAS
*Acting Director of the United States Patent and Trademark Office*